(12) United States Patent
Chirko et al.

(10) Patent No.: US 10,480,273 B2
(45) Date of Patent: Nov. 19, 2019

(54) HYBRID TWO PIECE PACKOFF ASSEMBLY

(71) Applicant: FMC Technologies, Inc., Houston, TX (US)

(72) Inventors: Roman Chirko, Tomball, TX (US); Kien Tan Vu, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 687 days.

(21) Appl. No.: 14/992,296

(22) Filed: Jan. 11, 2016

(65) Prior Publication Data

US 2017/0198540 A1    Jul. 13, 2017

(51) Int. Cl.
*E21B 33/04*    (2006.01)
*E21B 33/03*    (2006.01)
(Continued)

(52) U.S. Cl.
CPC .................................... *E21B 33/04* (2013.01)

(58) Field of Classification Search
CPC .......... E21B 33/03; E21B 33/04; E21B 33/12; E21B 33/043; E21B 33/038; E21B 33/042; F16J 15/08
See application file for complete search history.

(56) References Cited

U.S. PATENT DOCUMENTS 3,871,449 A * 3/1975 Ahlstone ............... E21B 33/043
166/183
4,550,782 A  11/1985 Lawson
(Continued)

FOREIGN PATENT DOCUMENTS

WO    WO 2010/065012 A1    6/2010

OTHER PUBLICATIONS

Layout of Applicant's Prior Art System: EOG Resources, Split Unihead 11-5K X 11-5K, Type II Conventional, 11-5K X 7-5K (sold prior to Jan. 11, 2015).
(Continued)

*Primary Examiner* — David J Bagnell
*Assistant Examiner* — Manuel C Portocarrero
(74) *Attorney, Agent, or Firm* — Henry C. Query, Jr.

(57) ABSTRACT

A packoff assembly for sealing between an inner tubular member and an outer tubular member has a lower packoff which is configured to seal between the inner and outer tubular members, an upper packoff which is configured to seal between the inner and outer tubular members above the lower packoff, the upper packoff being releasably connected to the lower packoff and, when connected to the lower packoff, being axially movable relative to the lower packoff between a first position and a second position, a latch ring which is supported on the lower packoff, the latch ring being radially expandable into a corresponding locking groove in the outer tubular member, and a locking mandrel which is operably engaged by the upper packoff such that upon axial movement of the upper packoff from the first position to the second position, the locking mandrel expands the latch ring into the locking groove to thereby lock the upper and lower packoffs in position between the inner and outer tubular members. With the lower packoff locked in position between the inner and outer tubular members, the upper packoff can be selectively removed from the packoff assembly by disconnecting the locking mandrel from the upper packoff and disconnecting the upper packoff from the lower packoff.

34 Claims, 9 Drawing Sheets

(51) Int. Cl.
    *E21B 33/12*     (2006.01)
    *E21B 33/043*     (2006.01)
    *E21B 33/038*     (2006.01)
    *F16J 15/08*     (2006.01)

(56) References Cited

U.S. PATENT DOCUMENTS

| | | |
|---|---|---|
| 4,595,063 A | 6/1986 | Jennings et al. |
| 4,719,971 A | 1/1988 | Owens |
| 4,815,770 A | 3/1989 | Hyne et al. |
| 4,900,041 A | 2/1990 | Hopkins et al. |
| 5,174,376 A | 12/1992 | Singeetham |
| 5,330,002 A | 7/1994 | Saunders |
| 2002/0017384 A1 | 2/2002 | Ostocke et al. |
| 2014/0069631 A1 | 3/2014 | Gette et al. |

OTHER PUBLICATIONS

Layout of Applicant's Prior Art System: BP "Cotton Valley", 11-5K X 7 1/16-10K X 2 9/16-5K, 9 5/8 X 7 X 4 1/2 X 2 7/8 CSG Program (sold prior to Jan. 11, 2015).

Layout of Applicant's Prior Art System: BP Cotton Valley & Granite Wash, 20 X 9-5/8 X 7 X 2-3/8 Gen 4 (sold prior to Jan. 11, 2015).

\* cited by examiner

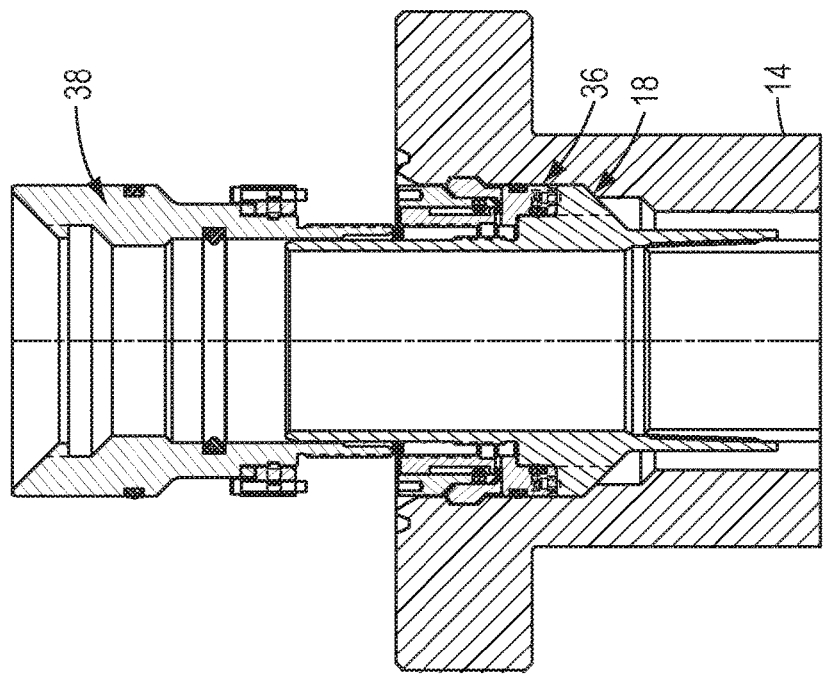
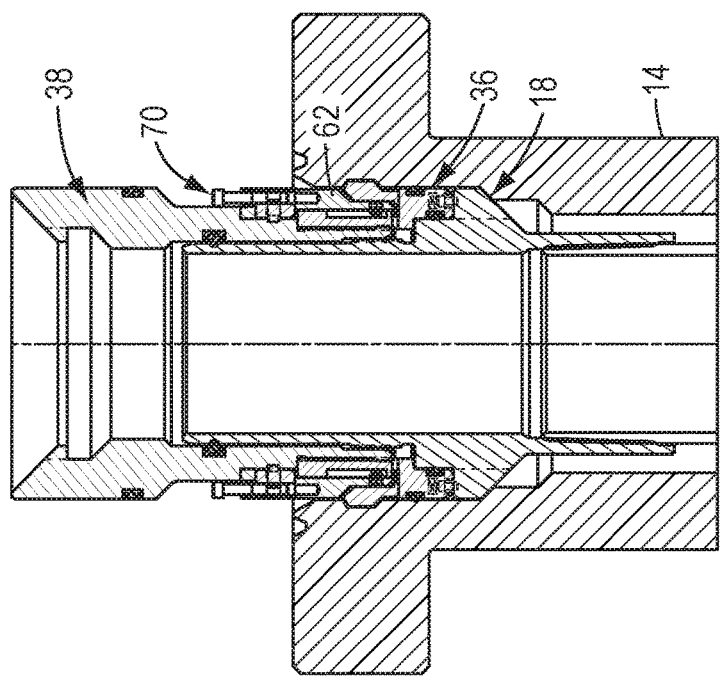

HYBRID TWO PIECE PACKOFF ASSEMBLY

The present invention is directed to a packoff assembly for sealing the annulus between an inner tubular member and an outer tubular member, such as between a wellhead and a casing hanger which is landed in the wellhead. More particularly, the invention is directed to a packoff assembly which can be run, landed and locked in one trip and without the use of external lock down screws. The invention is further directed to a packoff assembly which comprises an upper packoff that is disconnectable from a lower packoff to allow the packoff assembly to be adapted for use with different configurations of the wellhead assembly.

BACKGROUND OF THE INVENTION

Packoff assemblies are commonly used in the hydrocarbon production industry to seal various annuli in the wellhead assembly, such as the annulus between a wellhead and a casing hanger which is landed in the wellhead. When the wellhead assembly is configured for drilling operations, a blowout preventer (BOP) or BOP adapter is usually connected to the top of the wellhead, and in this situation a hybrid packoff comprising a lower packoff for sealing between the casing hanger and the wellhead and an upper packoff for sealing between the casing hanger and the BOP or BOP adapter may be employed. Such hybrid packoffs are usually run and landed in the wellhead in one trip and then locked to the wellhead using external lockdown screws. Alternatively, a latching packoff can be run in two trips. However, making two trips to run, land and lock the packoff consumes valuable rig time, and using external lockdown screws requires undesirable penetrations.

Also, after drilling operations are completed, the wellhead assembly is normally converted for use in production operations. This usually requires disconnecting the BOP or BOP adapter from the wellhead and then mounting a tubing head on the wellhead. After the BOP or BOP adapter is removed, the need for the upper packoff no longer exists, and in fact the tubing head usually cannot be mounted on the wellhead with the upper packoff in place due to space constraints in the cellar. Therefore, before the tubing head can be mounted on the wellhead, the hybrid packoff must either be removed and replaced with a single packoff that is configured to seal between the casing hanger and the wellhead or, if the hybrid packoff comprises separate upper and lower packoffs, the upper packoff must be disconnected from the lower packoff and removed. However, both of these options are undesirable. Removing the entire hybrid packoff leaves the annulus between the casing hanger and the wellhead unsealed, and removing just the upper packoff of a two piece hybrid packoff requires the extra step of disengaging the external lockdown screws.

SUMMARY OF THE INVENTION

In accordance with the present invention, these and other disadvantages with the prior art are addressed by providing a packoff assembly for sealing between an inner tubular member and an outer tubular member, the packoff assembly comprising an upper packoff which is configured to seal between the inner and outer tubular members above the lower packoff, the upper packoff being releasably connected to the lower packoff and, when connected to the lower packoff, being axially movable relative to the lower packoff between a first position and a second position; a latch ring which is supported on the lower packoff, the latch ring being radially expandable into a corresponding locking groove in the outer tubular member; and a locking mandrel which is operably engaged by the upper packoff such that upon axial movement of the upper packoff from the first position to the second position, the locking mandrel expands the latch ring into the locking groove to thereby lock the upper and lower packoffs in position between the inner and outer tubular members; wherein with the lower packoff locked in position between the inner and outer tubular members, the upper packoff can be selectively removed from the packoff assembly by disconnecting the locking mandrel from the upper packoff and disconnecting the upper packoff from the lower packoff.

In one embodiment of the invention, the upper packoff may be releasably connected to the lower packoff via a threaded connection which converts rotation of the upper packoff relative to the lower packoff into axial movement of the upper packoff relative to the lower packoff. In this embodiment, the locking mandrel may be releasably and/or rotatably connected to the upper packoff. For example, the locking mandrel may be releasably connected to a connecting ring which in turn is rotatably connected to the upper packoff. In this example, the locking mandrel may be releasably connected to the connecting ring by a number of screws, each of which extends axially through the connecting ring and into a corresponding bore in the locking mandrel. Also, the connecting ring may be rotatably connected to the upper packoff by a number of screws, each of which extends radially through the connecting ring and into an annular groove which is formed concentrically on an outer surface portion of the upper packoff.

In another embodiment of the invention, the lower packoff may comprise a lower seal support ring and an upper guide sleeve which is connected to or formed integrally with the seal support ring, the upper packoff may comprise an upper seal support sleeve and a lower actuating sleeve which is connected to or formed integrally with the seal support sleeve, and the actuating sleeve may be releasably connected to the guide sleeve to thereby releasably connect the upper packoff to the lower packoff.

In a further embodiment of the invention, the actuating sleeve may be releasably connected to the guide sleeve via a threaded connection which converts rotation of the upper packoff relative to the lower packoff into axial movement of the upper packoff relative to the lower packoff. In this embodiment, the locking mandrel is rotatably connected to the upper packoff. For example, the locking mandrel may be releasably connected to a connecting ring which in turn is rotatably connected to the upper packoff. In this example, the locking mandrel may be releasably connected to the connecting ring by a number of screws, each of which extends axially through the connecting ring and into a corresponding bore in the locking mandrel. Also, the connecting ring may be rotatably connected to the upper packoff by a number of screws, each of which extends radially through the connecting ring and into an annular groove which is formed concentrically on an outer surface portion of the upper packoff.

In yet another embodiment of the invention, the packoff assembly may comprise means for preventing rotation of the lower packoff upon rotation of the upper packoff and/or means for preventing rotation of the locking mandrel upon rotation of the upper packoff.

In a further embodiment of the invention, the packoff assembly may include a middle packoff which is positioned axially between the upper packoff and the lower packoff, wherein the upper packoff is non-rotatably connected to the middle packoff and the middle packoff is releasably connected to the lower packoff. In this embodiment, the middle packoff may be releasably connected to the lower packoff via a threaded connection which converts rotation of the middle packoff relative to the lower packoff into axial movement of the middle packoff relative to the lower packoff. Also, the middle packoff may be releasably connected to the upper packoff.

The present invention is also directed to a packoff assembly for use in a wellhead assembly, the wellhead assembly comprising a first outer tubular member, a second outer tubular member which is mounted on the first outer tubular member, and an inner tubular member which is landed in the first outer tubular member, the packoff assembly including a lower packoff which is configured to seal between the inner tubular member and the first outer tubular member; an upper packoff which is configured to seal between the inner tubular member and the second outer tubular member, the upper packoff being releasably connected to the lower packoff and, when connected to the lower packoff, being axially movable relative to the lower packoff between a first position and a second position; a latch ring which is supported on the lower packoff, the latch ring being radially expandable into a corresponding locking groove in the first outer tubular member; and a locking mandrel which is operably engaged by the upper packoff such that upon axial movement of the upper packoff from the first position to the second position, the locking mandrel expands the latch ring into the locking groove to thereby lock the upper and lower packoffs to the first outer tubular member; wherein with the lower packoff locked in position between the inner tubular member and the first outer tubular member and with the second outer tubular member removed from the first outer tubular member, the upper packoff can be removed from the packoff assembly by disconnecting the locking mandrel from the upper packoff and disconnecting the upper packoff from the lower packoff.

In one embodiment of the invention, the upper packoff may be releasably connected to the lower packoff via a threaded connection which converts rotation of the upper packoff relative to the lower packoff into axial movement of the upper packoff relative to the lower packoff. Also, the locking mandrel may be releasably and/or rotatably connected to the upper packoff. For example, the locking mandrel may be releasably connected to a connecting ring which in turn is rotatably connected to the upper packoff. In this example, the locking mandrel may be releasably connected to the connecting ring by a number of screws, each of which extends axially through the connecting ring and into a corresponding bore in the locking mandrel. Also, the connecting ring may be rotatably connected to the upper packoff by a number of screws, each of which extends radially through the connecting ring and into an annular groove which is formed concentrically on an outer surface portion of the upper packoff.

In another embodiment of the invention, the lower packoff may comprise a lower seal support ring and an upper guide sleeve which is connected to or formed integrally with the seal support ring, the upper packoff may comprise an upper seal support sleeve and a lower actuating sleeve which is connected to or formed integrally with the seal support sleeve, and the actuating sleeve may be releasably connected to the guide sleeve to thereby releasably connect the upper packoff to the lower packoff. The actuating sleeve may be releasably connected to the guide sleeve via a threaded connection which converts rotation of the upper packoff relative to the lower packoff into axial movement of the upper packoff relative to the lower packoff.

In a further embodiment of the invention, the locking mandrel may be rotatably connected to the upper packoff. For example, the locking mandrel may be releasably connected to a connecting ring which in turn is rotatably connected to the upper packoff. In this example, the locking mandrel may be releasably connected to the connecting ring by a number of screws, each of which extends axially through the connecting ring and into a corresponding bore in the locking mandrel and each of which is accessible upon removal of the second outer tubular member from the first outer tubular member. Also, the connecting ring may be rotatably connected to the upper packoff by a number of screws, each of which extends radially through the connecting ring and into an annular groove which is formed concentrically on an outer surface portion of the upper packoff.

In yet another embodiment of the invention, the packoff assembly may comprise means for preventing rotation of the lower packoff upon rotation of the upper packoff and/or means for preventing rotation of the locking mandrel upon rotation of the upper packoff.

In yet another embodiment of the invention, the packoff assembly may include a middle packoff which is positioned axially between the upper packoff and the lower packoff, wherein the upper packoff is non-rotatably connected to the middle packoff and the middle packoff is releasably connected to the lower packoff. In this embodiment, the middle packoff may be releasably connected to the lower packoff via a threaded connection which converts rotation of the middle packoff relative to the lower packoff into axial movement of the middle packoff relative to the lower packoff. Also, the middle packoff may be releasably connected to the upper packoff.

The present invention is also directed to a method for sealing a wellhead assembly which is initially configured for use in performing a first operation and is subsequently configured for use in performing a second operation, the wellhead assembly in the initial configuration comprising a first outer tubular member, a second outer tubular member which is mounted on the first outer tubular member, and an inner tubular member which is landed in the first outer tubular member, and the wellhead assembly in the subsequent configuration comprising the first outer tubular member, the inner tubular member which is landed in the first outer tubular member, and a third outer tubular member which is mounted on the first outer tubular member in place of the second outer tubular member, the method comprising (a) providing a packoff assembly which includes lower packoff that is releasably connected to an upper packoff, the lower packoff being configured to seal between the inner tubular member and the first outer tubular member and the upper packoff being configured to seal between the inner tubular member and the second outer tubular member; (b) releasably connecting an installation tool to the upper packoff; (c) using the installation tool, lowering the packoff assembly as a unit through the second outer tubular member until the lower packoff is positioned between the inner tubular member and the first outer tubular member and the upper packoff is positioned between the inner tubular member and the second outer tubular member; (d) using the installation tool, locking the lower packoff to the first outer tubular member to thereby secure the lower packoff in position between the inner tubular member and the first outer tubular member and the upper packoff in position between the inner tubular member and the second outer tubular member; (e) disconnecting the installation tool from the upper packoff; (f) after the first operation is performed, removing the second outer tubular member from the first outer tubular member; (g) removing the upper packoff from the lower packoff; and (h) mounting the third outer tubular member on the first outer tubular member; wherein steps (c) and (d) are performed in a single trip; and wherein the lower packoff remains locked in position between the inner tubular member and the first outer tubular member from step (d) through step (h). In an alternative embodiment, the lower packoff may be releasably connected to a middle packoff which in turn is connected to the upper packoff.

Thus, it may be seen that the packoff assembly of the present invention offers several advantages. When the packoff assembly is used in a first configuration of the wellhead assembly, such as a drilling configuration, the packoff assembly can be run, landed and locked in the wellhead in a single trip. In addition, both the lower packoff and the upper packoff are locked in the wellhead using a single latch ring. Consequently, external lockdown screws are not required to secure the packoff assembly in the wellhead, and the undesirable penetrations required by such lockdown screws are therefore avoided. Also, when converting the wellhead assembly from the first configuration to a second configuration, such as a production configuration, the upper packoff can be disconnected from the lower packoff without the need to disengage the latch ring. As a result, the lower packoff remains securely locked in the wellhead throughout the conversion of the wellhead assembly.

These and other objects and advantages of the present invention will be made apparent from the following detailed description, with reference to the accompanying drawings. In the drawings, the same reference numbers may be used to denote similar components in the various embodiments.

BRIEF DESCRIPTION OF THE DRAWINGS

FIGS. 4-12 are sequential cross sectional views of the process for installing the packoff assembly of the present invention in a wellhead assembly which is initially configured for drilling and subsequently configured for production.

DETAILED DESCRIPTION OF THE INVENTION

The packoff assembly of the present invention is designed to seal the annulus which is formed between an inner tubular member and an outer tubular member. As used herein, unless the context dictates otherwise, the term "tubular member" can be interpreted to include either a single tubular member or a pair of tubular members which are axially aligned and connected together in an end-to-end, nesting, telescoping or other such configuration. Also, although the packoff assembly may be used in a variety of applications, for purposes of brevity it will be described herein in conjunction with a wellhead assembly for a hydrocarbon well.

Figure 1:
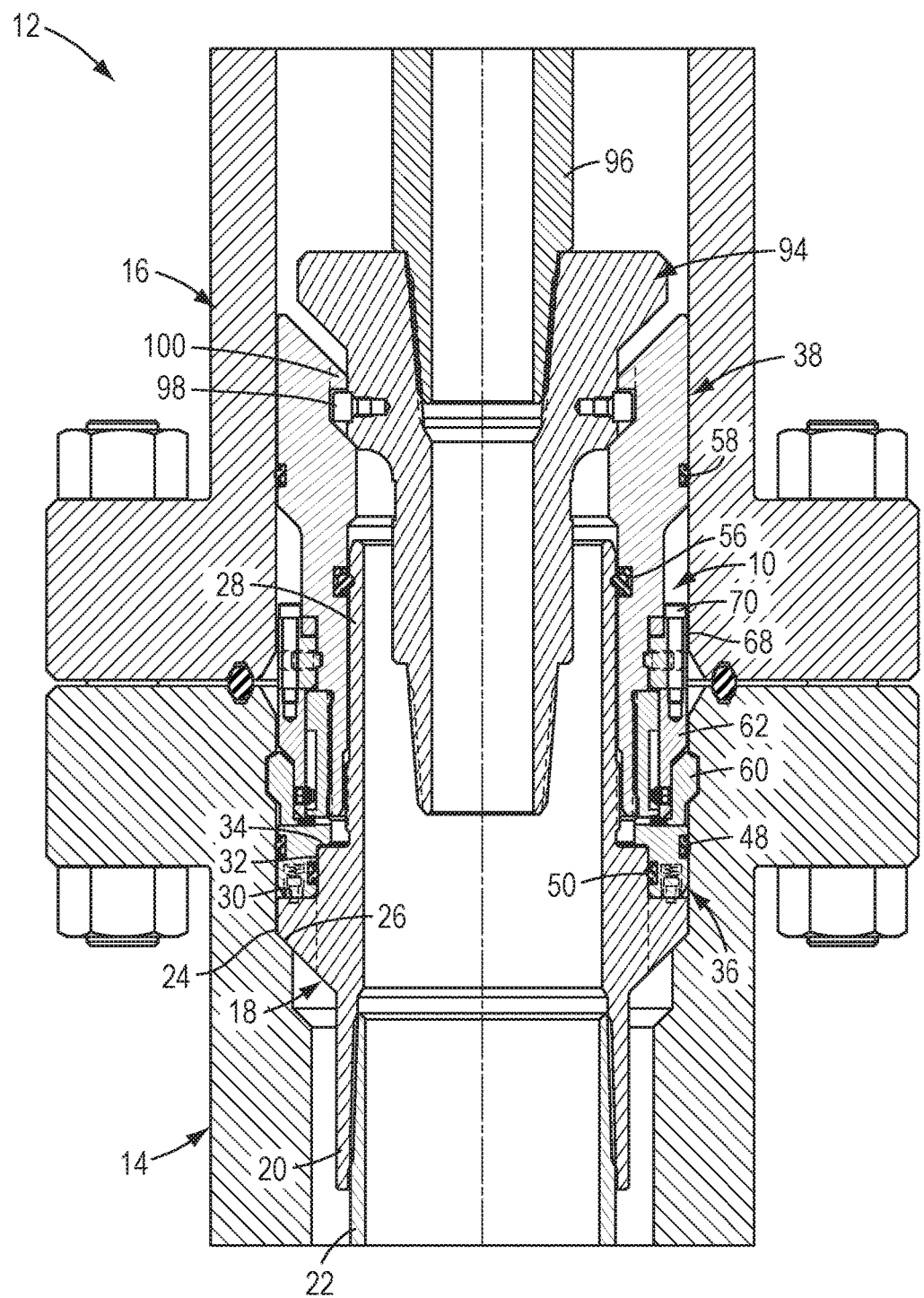
FIG. 1 is a cross sectional view of a first embodiment of the packoff assembly of the present invention shown installed in a representative wellhead assembly which is configured for drilling.

Referring to FIG. 1, the packoff assembly of the present invention, generally 10, is shown installed in a representative wellhead assembly 12. The wellhead assembly 12, which is shown in a drilling configuration, includes a casing head or wellhead 14 which is positioned at the upper end of a well bore (not shown), a blowout preventer ("BOP") or BOP adapter 16 (only the lower portion of which is shown) which is mounted to the top of the wellhead, and a casing hanger 18 which is landed in the wellhead. In this example, the casing hanger 18 includes, from bottom to top, a lower end portion 20 to which a casing string 22 is connected, an intermediate seat portion 24 which is configured to be landed on an annular load shoulder 26 in the wellhead 14, and a tubular neck portion 28 which extends axially upwardly from the seat portion. In cross section, the seat portion 24 includes a first ledge portion 30 which extends radially inwardly from the outer diameter of the seat portion, a wall portion 32 which extends axially upwardly from a radially inner end of the first ledge portion, and a second ledge portion 34 which extends radially inwardly from an upper end of the wall portion.

Figure 2:
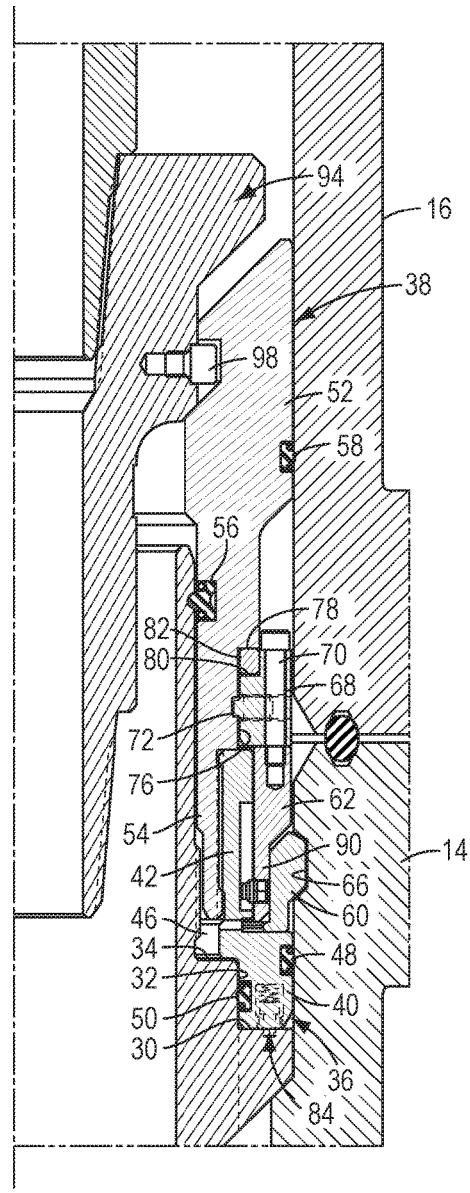
FIG. 2 is an enlarged cross sectional view of the packoff assembly shown in FIG. 1.
Figure 2A:
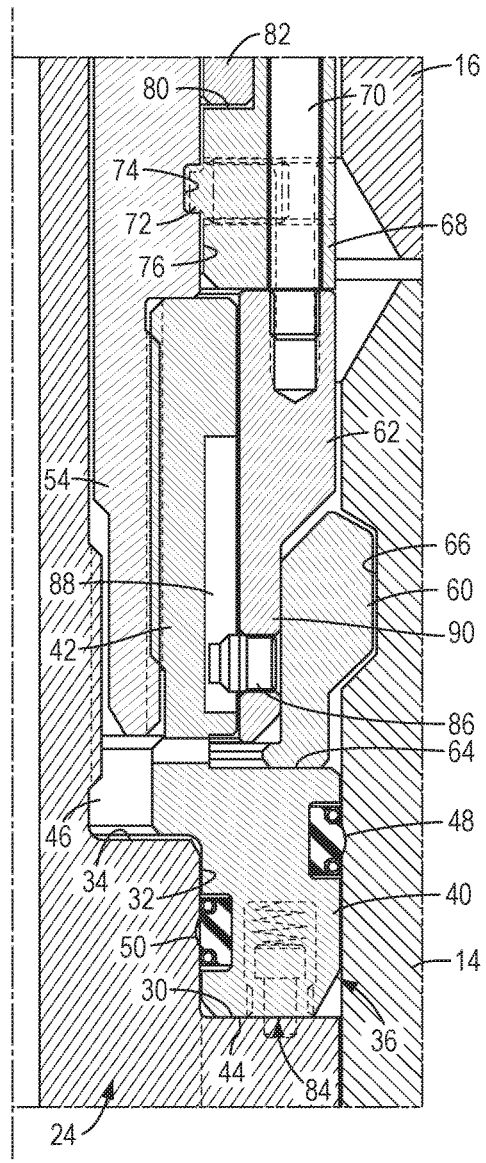
FIG. 2A is an enlarged cross sectional view of the lower packoff member of the packoff assembly shown in FIG. 2.

Referring also to FIGS. 2 and 2A, the packoff assembly 10 includes a lower packoff 36 which, in the configuration of the packoff assembly shown in FIG. 1, is releasably connected to an upper packoff 38. The lower packoff 36 is configured to seal between the casing hanger 18 and the wellhead 14 and, in the configuration of the wellhead assembly 12 shown in FIG. 1, the upper packoff 38 is configured to seal between the casing hanger and the BOP 16. As will be described in more detail below, the packoff assembly 10 is configured such that, when the BOP 16 is removed from the wellhead 14, the upper packoff 38 can be disconnected from the lower packoff 36. This feature allows the lower packoff 36 to remain in position between the casing hanger 18 and the wellhead 14 for other configurations of the wellhead assembly 12.

Referring still to FIGS. 2 and 2A, the lower packoff 36 comprises a lower seal support ring 40 which is connected to or formed integrally with an upper guide sleeve 42. The seal support ring 40 is configured to be received in an annular seal pocket which is formed between the wellhead 14 and the wall portion 32 of the casing hanger 18. The seal support ring 40 includes a lower end surface 44 which engages the first ledge portion 30 of the casing hanger 18 and a radially inwardly projecting ledge 46 which overhangs the second ledge portion 34 of the casing hanger. The lower packoff 36 is sealed to the wellhead 14 by a first annular sealing member 48 which is mounted in a corresponding groove on the outer diameter surface of the seal support ring 40 and to the casing hanger 18 by a second annular sealing member 50 which is mounted in a corresponding groove on the inner diameter surface of the seal support ring. Thus, when the lower packoff 36 is locked in position between the casing hanger 18 and the wellhead 14, the first and second sealing members 48, 50 will seal off the annulus below the seat portion 24 of the casing hanger.

The upper packoff 38 includes an upper seal support sleeve 52 which is connected to or formed integrally with a lower actuating sleeve 54. The upper packoff 38 is sealed to the casing hanger 18, and in particular to the neck portion 28 of the casing hanger, by a third annular sealing member 56 which is mounted in a corresponding groove on the inner diameter surface of the seal support sleeve 52 and, in the configuration of the wellhead assembly shown in FIG. 1, to the BOP 16 by a fourth annular sealing member 58 which is mounted in a corresponding groove on the outer diameter surface of the seal support sleeve. Thus, when the upper packoff 38 is locked in position between the casing hanger 18 and the BOP 16, the third and fourth sealing members 56, 58 will seal off the annulus above the seat portion 24 of the casing hanger.

Referring still to FIGS. 1, 2 and 2A, the packoff assembly 10 is locked in position in the wellhead 14 by an expandable latch ring 60 which is actuated by a locking mandrel 62. The latch ring 60 is axially supported on an upper surface 64 of the seal support ring 40 and is radially expandable from a first or unlatched position in which the latch ring is positioned radially inwardly of the wellhead 14 to a second or latched position in which a radially outer portion of the latch ring is positioned in a corresponding locking groove 66 formed in the wellhead. During actuation of the latch ring 60, the locking mandrel 62 forces the latch ring radially outwardly into the locking groove 66 to thereby secure the packoff assembly 10 to the wellhead. In this position, any forces tending to push the lower packoff 36 out of its seal pocket between the casing hanger 18 and the wellhead 14 will be transmitted through the seal support ring 40 and the latch ring 60 and into the wellhead via the locking groove 66.

In accordance with the present invention, the locking mandrel 62 is operably engaged by the upper packoff 38 such that axial movement of the upper packoff downward relative to the lower packoff 36 will force the locking mandrel downward and expand the latch ring 60 into the locking groove 66 to thereby lock the upper and lower packoffs in position between the inner and outer tubular members. In one exemplary embodiment of the invention, the locking mandrel 62 is releasably connected to the upper packoff 38 such as, e.g., by a connecting ring 68 and a number of cap screws 70. The connecting ring 68 is secured to upper packoff 38, and the cap screws 70 extend axially through corresponding holes in the connecting ring and are threaded into respective bores in the top of the locking mandrel 62 to thereby secure the locking mandrel to the connecting ring. In this embodiment of the invention, the connecting ring 68 may be rotatably connected to the upper packoff 38 by a number of set screws 72, the distal ends of which are received in an annular groove 74 which is formed in the outer diameter surface of the upper packoff. Furthermore, the connecting ring 68 may be connected to a reduced diameter portion 76 of the upper packoff 38. In this example, the reduced diameter portion 76 defines a shoulder 78 and the connecting ring 68 comprises an opposing counterbore 80 between which a bushing ring 82 may be located to facilitate rotation of the connecting ring relative to the upper packoff 38.

In an exemplary embodiment of the present invention, the latch ring 60 may be actuated by rotating the upper packoff 38 relative to the lower packoff 36. Due to the threaded connection between the guide sleeve 42 of the lower packoff 36 and the actuating sleeve 54 of the upper packoff 38, rotation of the upper packoff relative to the lower packoff will move the upper packoff axially toward the lower packoff. During this operation, the lower packoff 36 is prevented from rotating relative to the casing hanger 18 by suitable means. For example, the lower packoff 36 may include a number of spring-loaded anti-rotation pins 84 (which are shown in phantom in the figures), which are mounted in the lower end surface 44 of the seal support ring 40. Upon initial rotation of the lower packoff 36 by the upper packoff 38, the anti-rotation pins 84 will spring into corresponding holes in the first ledge portion 30 of the casing hanger 18 and thereby prevent further rotation of the lower packoff relative to the casing hanger.

The packoff assembly 10 may also include suitable means for preventing the locking mandrel 62 from rotating relative to the lower packoff 36 during rotation of the upper packoff 38. For example, the locking mandrel 62 may include a number of transverse pins 86 which extend into corresponding axial slots 88 formed in the outer diameter surface of the guide sleeve 42. In this manner, during rotation of the upper packoff 38, the pins 86 will engage the sides of the slots 88 and thereby prevent the locking mandrel 62 from rotating relative to the lower packoff 36. Moreover, as the upper packoff 38 moves axially toward the lower packoff 36, the pins 86 will move axially downward in the slots 88 and thus not inhibit the movement of the upper packoff. Furthermore, since the locking mandrel 62 is connected to the connecting ring 68 and the connecting ring is rotatably connected to the upper packoff 38, the locking mandrel is also rotatably connected to the upper packoff. Therefore, the locking mandrel 62 will not inhibit rotation of the upper packoff 38 during actuation of the latch ring 60.

Figure 3:
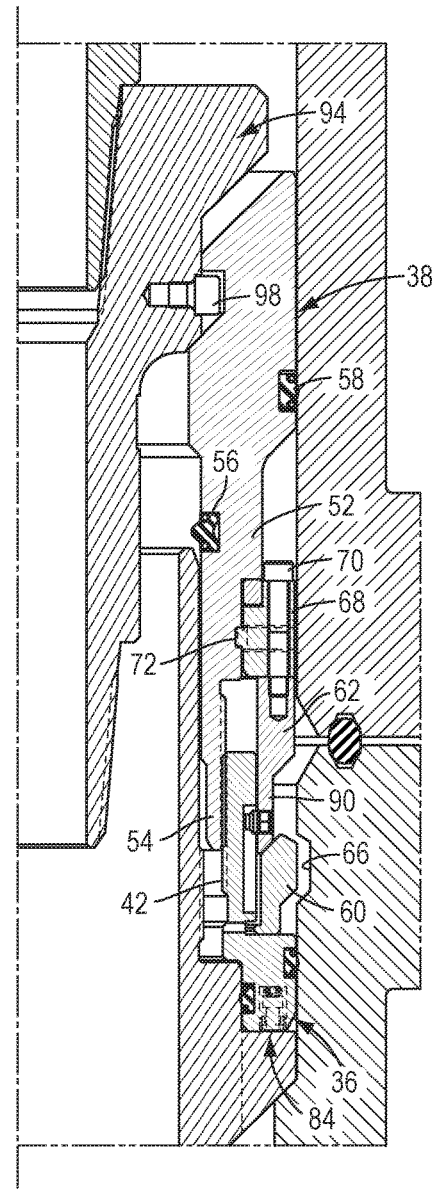
FIG. 3 is an enlarged cross sectional view similar to FIG. 2, but showing the packoff assembly in the unlocked position.
Figure 3A:
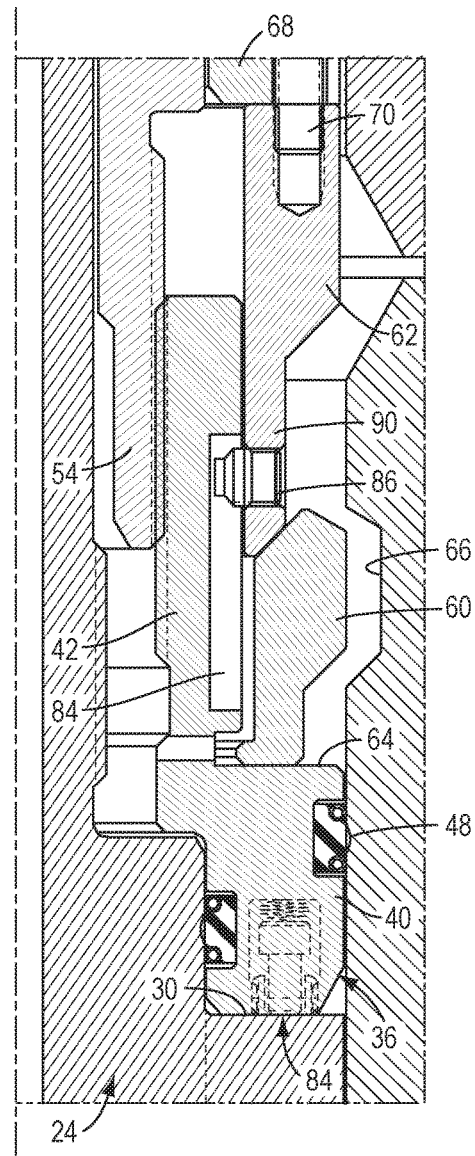
FIG. 3A is an enlarged cross sectional view of the lower packoff member of the packoff assembly shown in FIG. 3.

In the unlocked condition of the packoff assembly 10, which is shown in FIGS. 3 and 3A, the latch ring 60 is retracted from the locking groove 66 and a lower nose portion 90 of the locking mandrel 62 is located above or on top of the latch ring. In the exemplary embodiment of the invention, the latch ring 60 is moved into its latched position by rotating the upper packoff 38 relative to the lower packoff 36, which as discussed above is prevented from rotating by the anti-rotation pins 84. Due to the threaded connection between the guide sleeve 42 of the lower packoff 36 and the actuating sleeve 54 of the upper packoff 38, rotation of the upper packoff relative to the lower packoff will move the upper packoff axially toward the lower packoff. This action will in turn force the locking mandrel 62 downward and cause the nose portion 90 of the locking mandrel to cam the latch ring 60 radially outwardly into the locking groove 66 to thereby lock the packoff assembly 10 to the wellhead 14. In an alternative embodiment of the invention, the locking mandrel 62 is moved downward to actuate the latch ring 60 by applying a suitable axial force to the upper packoff 38.

Figure 5:
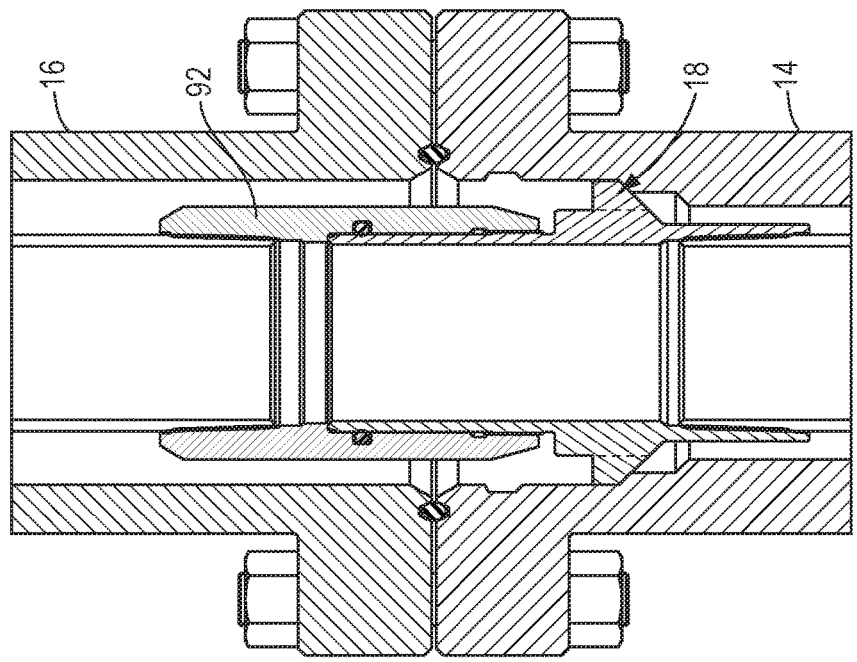
Figure 4:
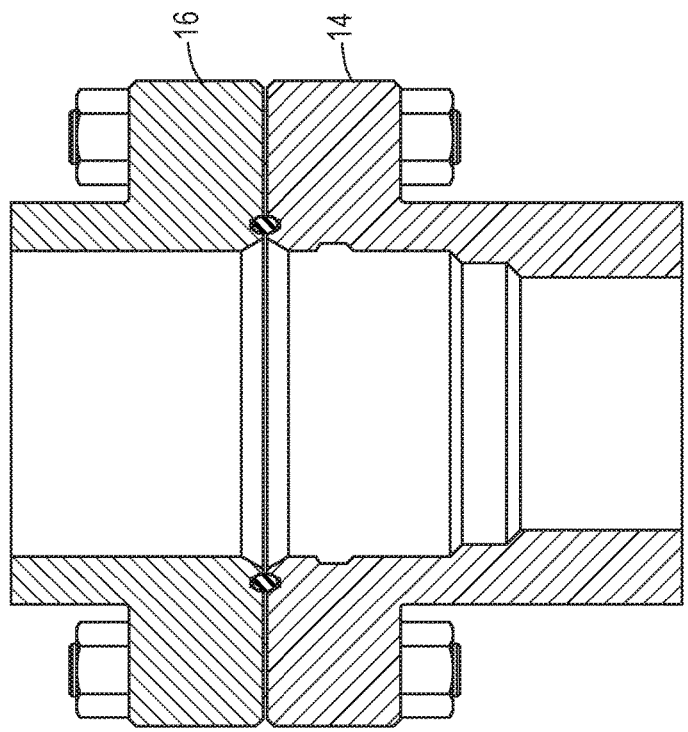

The process for installing the packoff assembly 10 in a wellhead assembly which is configured for drilling and then adapting the packoff assembly as the wellhead assembly is converted for production will now be described with reference to FIGS. 4-12. First, the wellhead 14 is installed in the well bore and the BOP 16 is connected to the top of the wellhead (FIG. 4). Then, the casing hanger 18 is made up to the top of the casing string 22 and lowered into the wellhead 14 on a hanger running and retrieval tool 92 (FIG. 5).

Figure 7:
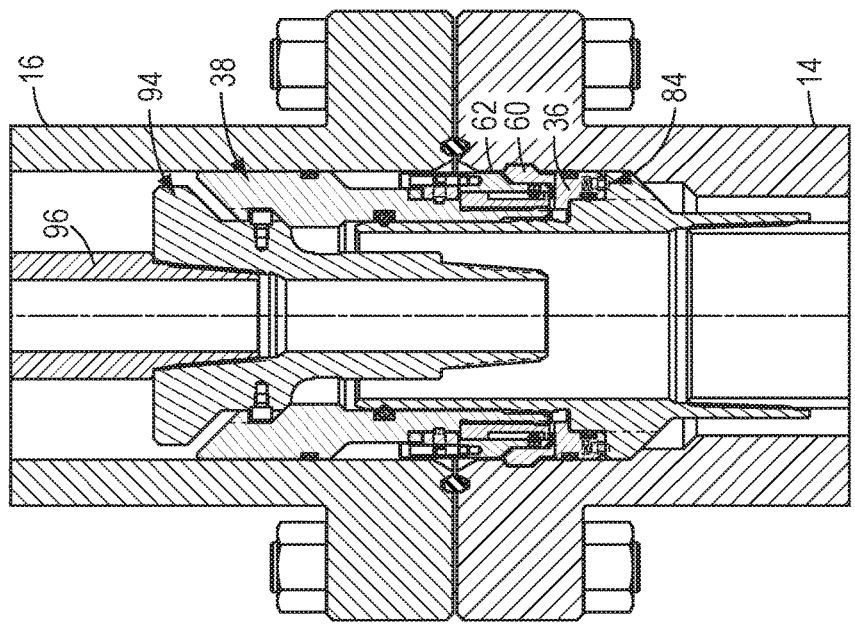
Figure 6:
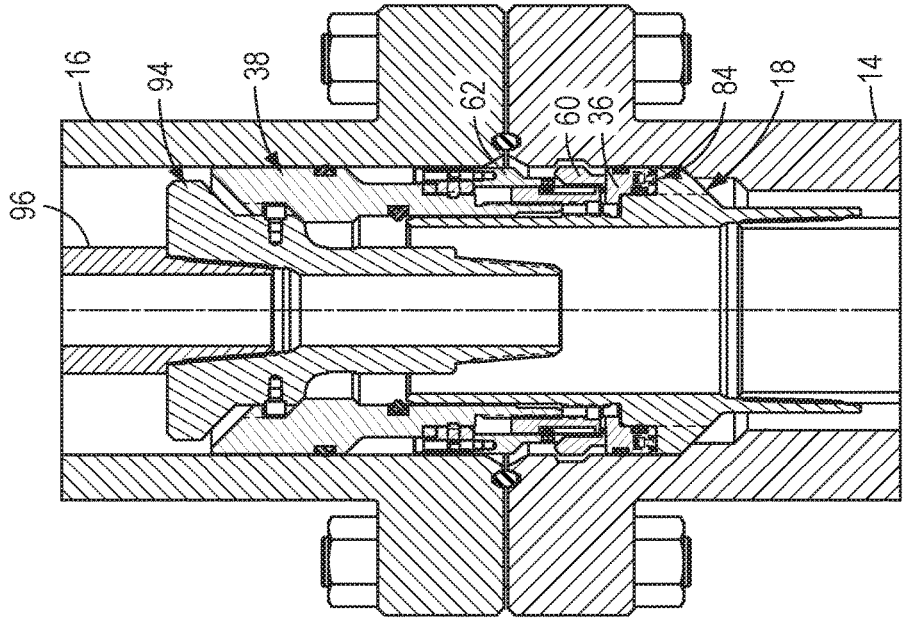

As shown in FIGS. 1 and 6, the packoff assembly is then lowered into the wellhead 14 on a packoff running and retrieval tool 94 which is connected to a length of drill pipe 96 or other suitable means. The packoff running and retrieval tool 94 includes a number of J-lugs 98 which engage corresponding J-slots 100 in the upper packoff 38 to thereby releasably connect the packoff running and retrieval tool to the packoff assembly 10. Once the lower packoff 36 is firmly landed in the seal pocket between the casing hanger 18 and the wellhead 14, the upper packoff 38 is rotated via the drill pipe 96 to actuate the latch ring 60. As discussed above, this action will force the latch ring 60 into the locking groove 66 and thereby lock the packoff assembly 10 to the wellhead (FIG. 7).

Figure 8:
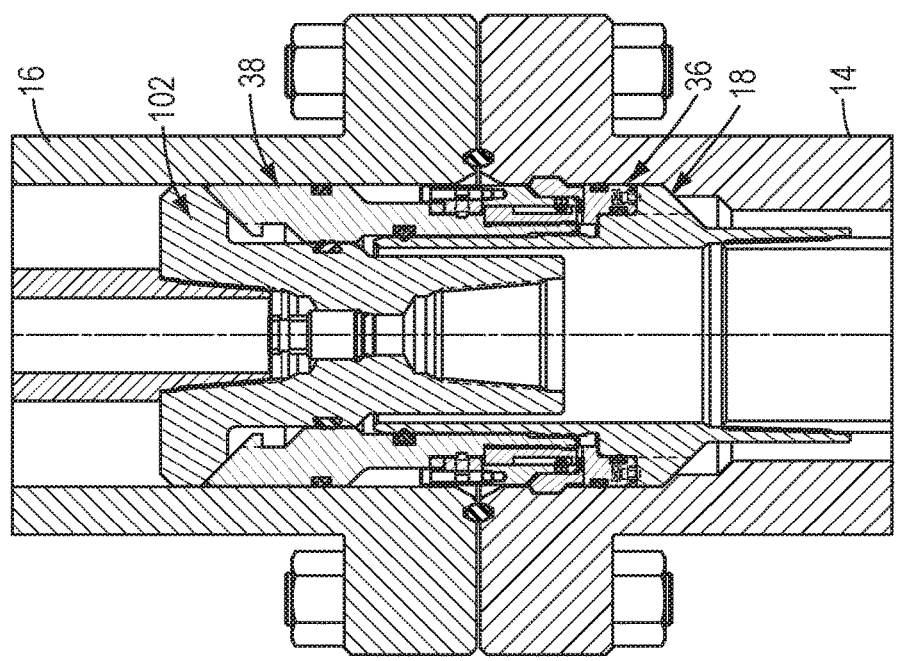

At this point, a BOP test plug 102 may be lowered through the BOP 16 and landed on the upper packoff 38 in preparation for pressure testing the BOP (FIG. 8). After the BOP is pressure tested, the BOP test plug 102 is removed and the well bore is drilled to a depth sufficient to accommodate the production tubing (not shown).

Figure 9:
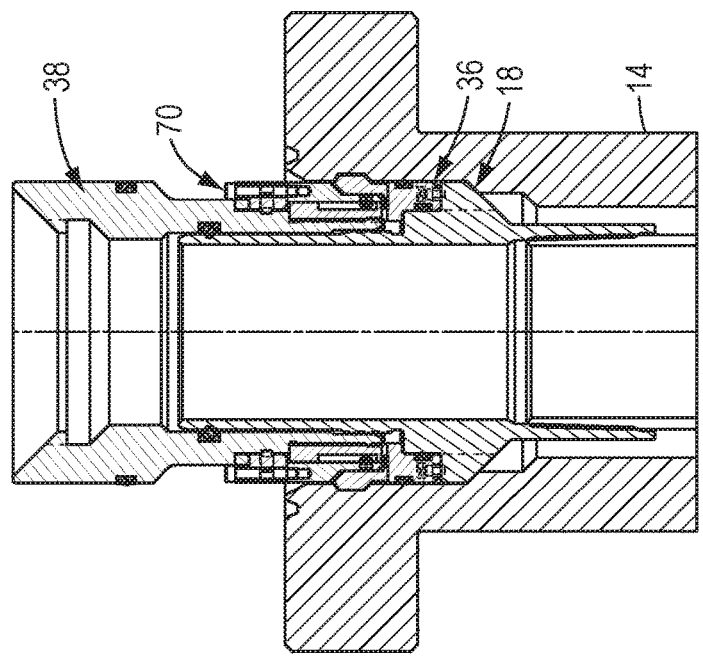

Once drilling is completed, the wellhead assembly is converted to a production configuration and the packoff assembly 10 is adapted for use in this configuration. First, the BOP 16 is removed from the wellhead 14 (FIG. 9). Then, the cap screws 70 are unscrewed to disconnect the upper packoff 38 from the locking mandrel 62 (FIG. 10). Next, the upper packoff 38 is rotated to unscrew the upper packoff from the lower packoff 26 (FIG. 11). This step may be performed using the packoff running and retrieval tool 94 (not shown). As shown in FIG. 11, the lower packoff 36 remains in position between the wellhead 14 and the casing hanger 18 after the upper packoff 38 is removed.

Figure 12:
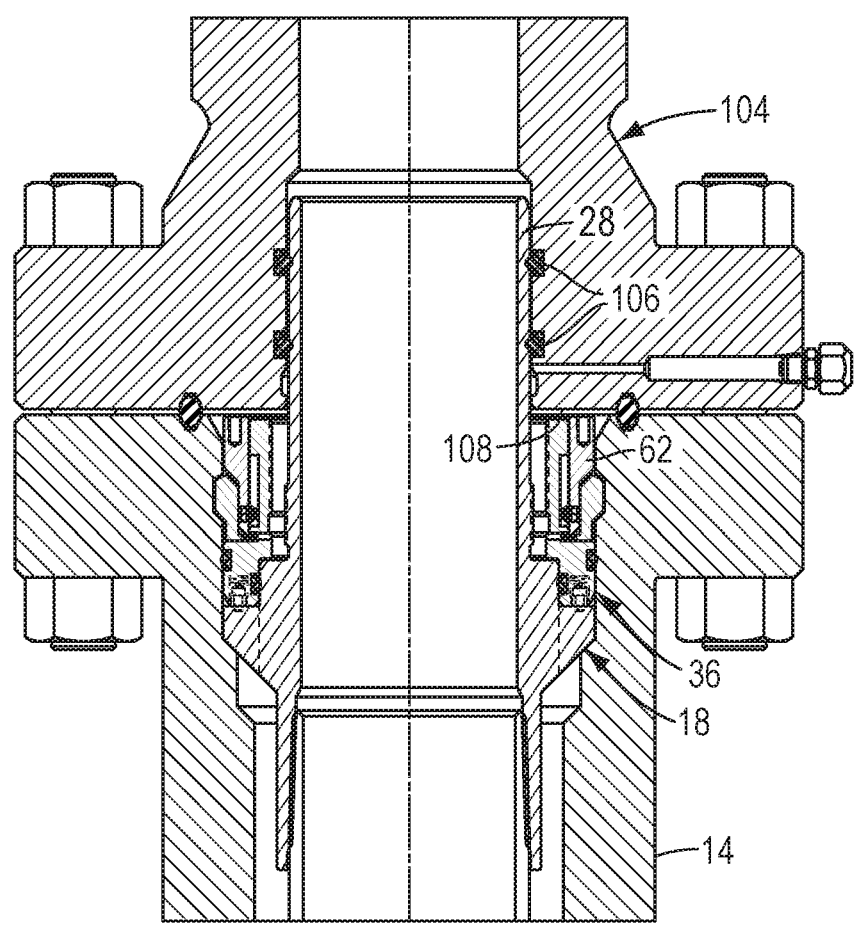

As shown in FIG. 12, with the upper packoff 38 removed, a tubing head 104 (only the lower portion of which is shown) is mounted on the wellhead 14 to complete the conversion of the wellhead assembly to the production mode. In this configuration, the neck portion 28 of the casing hanger 18 extends into a corresponding counterbore in the tubing head 104 and is sealed thereto by a number of suitable seals 106. In addition, the locking mandrel 62 is maintained in its locked position by a lower surface portion 108 of the tubing head 104. Consequently, the lower packoff 36 remains locked in the wellhead 14 without the use of lock down screws.

Figure 13:
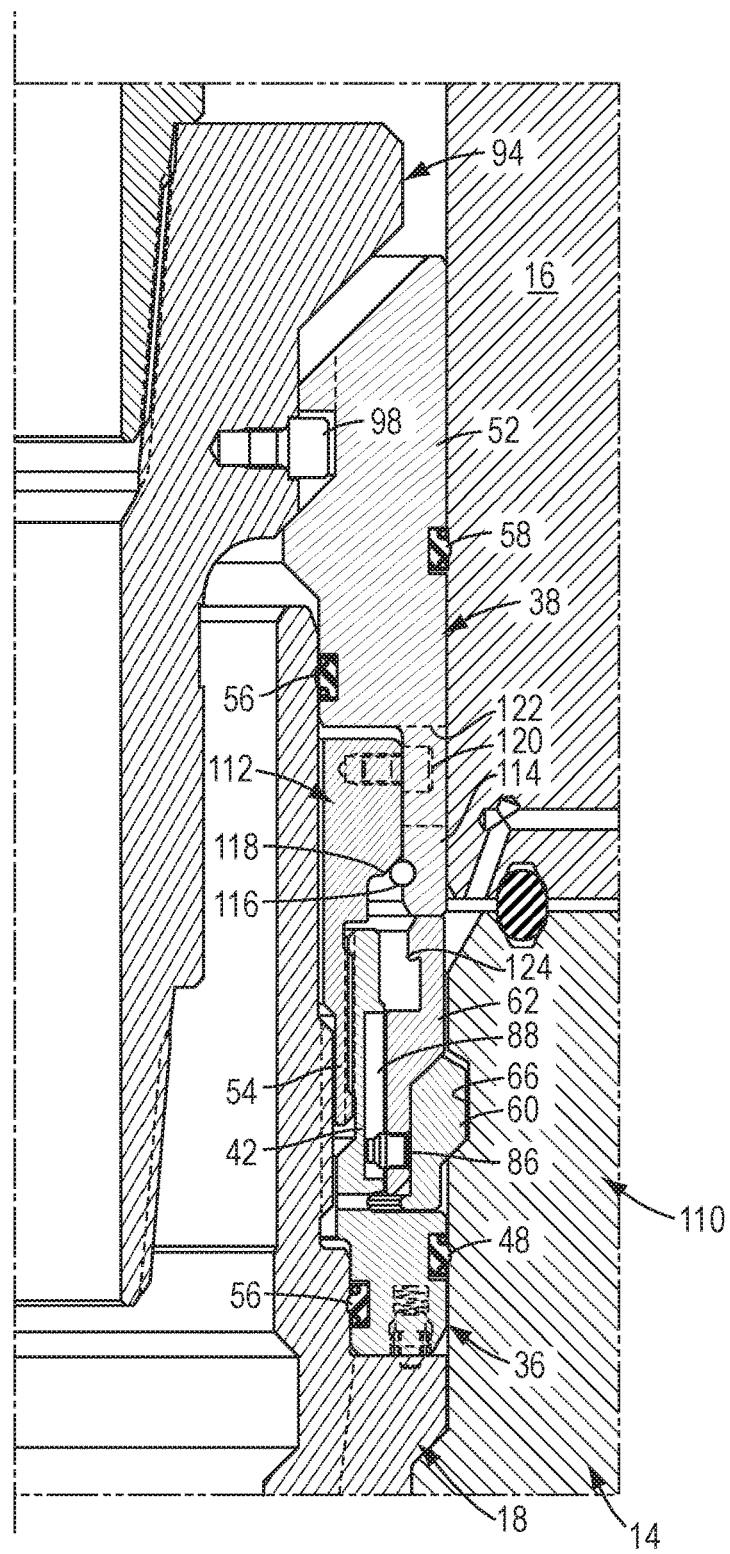
FIG. 13 is an enlarged cross sectional view of another embodiment of the packoff assembly of the present invention.

Another embodiment of the packoff assembly of the present invention is shown in FIG. 13. The packoff assembly of this embodiment, generally 110, is similar in many respects to the packoff assembly 10 described above. However, in addition to the lower packoff 36 and the upper packoff 38, the packoff assembly 110 also comprises a middle packoff 112. Also, rather than being connected to or formed integrally with the upper packoff 38, in the present embodiment the actuating sleeve 54 is connected to or formed integrally with the middle packoff 112. Further, the upper packoff 38 includes a lower connecting sleeve 114 which is positioned around a portion of the middle packoff 112 that is located above the actuating sleeve 54.

The middle packoff 112 is releasably connected to the upper packoff 38 using a retaining ring 116 which is received in a corresponding groove in the connecting sleeve 114 to thereby provide a seat for a downward facing shoulder 118 on the middle packoff. In addition, the packoff assembly 110 preferably includes means for transferring torque from the upper packoff 38 to the middle packoff 112. In the embodiment of the invention shown in FIG. 13, the torque transferring means includes a number of cap screws 120 which each extend through a corresponding axially elongated slot 122 in the connecting sleeve 114 and are secured to the middle packoff 112. In this manner, upon rotation of the upper packoff 38, the sides of the slots 122 will contact the heads of the cap screws 120 and thereby rotate the middle packoff 112.

The packoff assembly 110 is installed between the wellhead 14 and the casing hanger 18 in a manner similar to that described above for the packoff assembly 10. In order to adapt the packoff assembly 110 for use in a drilling configuration of the wellhead assembly, once the BOP 16 is removed from the wellhead 14, the upper packoff 38 is rotated to unscrew the middle packoff 112 from the lower packoff 36. This step may be performed using the packoff running and retrieval tool 94. During this operation, the retaining ring 116 will keep the middle packoff 112 connected to the upper packoff 38. If the need subsequently arises to remove the lower packoff 36 from between the wellhead 14 and the casing hanger 18, a suitable pulling tool (not shown) can be hooked into a corresponding profile 124 formed on the upper end of the locking mandrel 62. Pulling the locking mandrel 62 upward will release the latch ring 60 from the locking groove 66 in the wellhead 14, and further upward movement of the latch ring will cause the pins 86 to engage the tops of their corresponding slots 88 and pull the lower packoff 36 out of its sealing pocket between the wellhead and the casing hanger 18.

Although not shown in the drawings, the packoff assembly of the present invention may also be used with slip-type casing hangers. In this situation, the third seal 56 on the upper packoff 38 would seal directly to the upper end portion of the casing string rather than the neck portion 28 of the mandrel-type casing hanger 18 shown in FIG. 1. All other aspects of this embodiment of the invention are essentially the same as discussed above.

From the foregoing description it may be seen that the packoff assembly of the present invention offers several advantages over the prior art. When the packoff assembly is used in the drilling configuration of the wellhead assembly shown in FIG. 1, the packoff assembly can be run, landed and locked in the wellhead 14 in a single trip. In addition, both the lower packoff 36 and the upper packoff 38 (and, if present, the middle packoff 112) are locked in the wellhead 14 by a single latch ring 60. Consequently, external lock-down screws are not required to secure the packoff assembly in the wellhead, and the undesirable penetrations required by such lockdown screws are therefore avoided. Furthermore, when converting the wellhead assembly from a drilling configuration to a production configuration, the upper packoff 38 (and, if present, the middle packoff 112) is disconnectable from the lower packoff 36 without the need to disengage the latch ring 60. As a result, the lower packoff 36 remains securely locked in the wellhead 14 throughout the conversion of the wellhead assembly.

It should be recognized that, while the present invention has been described in relation to the preferred embodiments thereof, those skilled in the art may develop a wide variation of structural and operational details without departing from the principles of the invention. Therefore, the appended claims should be construed to cover all equivalents falling within the true scope and spirit of the invention.

What is claimed is:

1. A packoff assembly for sealing between an inner tubular member and an outer tubular member, the packoff assembly comprising:
   a lower packoff which is configured to seal between the inner and outer tubular members;
   an upper packoff which is configured to seal between the inner and outer tubular members above the lower packoff, the upper packoff being releasably connected to the lower packoff and, when connected to the lower packoff, being axially movable relative to the lower packoff between a first position and a second position;
   a latch ring which is supported on the lower packoff, the latch ring being radially expandable into a corresponding locking groove in the outer tubular member; and
   a locking mandrel which is operably engaged by the upper packoff such that upon axial movement of the upper packoff from the first position to the second position, the locking mandrel expands the latch ring into the locking groove to thereby lock the upper and lower packoffs in position between the inner and outer tubular members;

wherein with the lower packoff locked in position between the inner and outer tubular members, the upper packoff can be selectively removed from the packoff assembly by disconnecting the upper packoff from the lower packoff.

2. The packoff assembly of claim 1, wherein the upper packoff is releasably connected to the lower packoff via a threaded connection which converts rotation of the upper packoff relative to the lower packoff into axial movement of the upper packoff relative to the lower packoff.

3. The packoff assembly of claim 2, wherein the locking mandrel is releasably and rotatably connected to the upper packoff.

4. The packoff assembly of claim 3, wherein the locking mandrel is releasably connected to a connecting ring which in turn is rotatably connected to the upper packoff.

5. The packoff assembly of claim 4, wherein the locking mandrel is releasably connected to the connecting ring by a number of screws, each of which extends axially through the connecting ring and into a corresponding bore in the locking mandrel.

6. The packoff assembly of claim 5, wherein the connecting ring is rotatably connected to the upper packoff by a number of screws, each of which extends radially through the connecting ring and into an annular groove which is formed concentrically on an outer surface portion of the upper packoff.

7. The packoff assembly of claim 1, wherein the lower packoff comprises a lower seal support ring and an upper guide sleeve which is connected to or formed integrally with the seal support ring, wherein the upper packoff comprises an upper seal support sleeve and a lower actuating sleeve which is connected to or formed integrally with the seal support sleeve, and wherein the actuating sleeve is releasably connected to the guide sleeve to thereby releasably connect the upper packoff to the lower packoff.

8. The packoff assembly of claim 7, wherein the actuating sleeve is releasably connected to the guide sleeve via a threaded connection which converts rotation of the upper packoff relative to the lower packoff into axial movement of the upper packoff relative to the lower packoff.

9. The packoff assembly of claim 8, wherein the locking mandrel is rotatably connected to the upper packoff.

10. The packoff assembly of claim 9, wherein the locking mandrel is releasably connected to a connecting ring which in turn is rotatably connected to the upper packoff.

11. The packoff assembly of claim 10, wherein the locking mandrel is releasably connected to the connecting ring by a number of screws, each of which extends axially through the connecting ring and into a corresponding bore in the locking mandrel.

12. The packoff assembly of claim 11, wherein the connecting ring is rotatably connected to the upper packoff by a number of screws, each of which extends radially through the connecting ring and into an annular groove which is formed concentrically on an outer surface portion of the upper packoff.

13. The packoff assembly of claim 12, further comprising means for preventing rotation of the lower packoff upon rotation of the upper packoff.

14. The packoff assembly of claim 13, further comprising means for preventing rotation of the locking mandrel upon rotation of the upper packoff.

15. The packoff assembly of claim 1, further comprising a middle packoff which is positioned axially between the upper packoff and the lower packoff, wherein the upper packoff is non-rotatably connected to the middle packoff and the middle packoff is releasably connected to the lower packoff.

16. The packoff assembly of claim 15, wherein the middle packoff is releasably connected to the lower packoff via a threaded connection which converts rotation of the middle packoff relative to the lower packoff into axial movement of the middle packoff relative to the lower packoff.

17. The packoff assembly of claim 16, wherein the middle packoff is releasably connected to the upper packoff.

18. A packoff assembly for use in a wellhead assembly, the wellhead assembly comprising a first outer tubular member, a second outer tubular member which is mounted on the first outer tubular member, and an inner tubular member which is landed in the first outer tubular member, the packoff assembly including:

a lower packoff which is configured to seal between the inner tubular member and the first outer tubular member;

an upper packoff which is configured to seal between the inner tubular member and the second outer tubular member, the upper packoff being releasably connected to the lower packoff and, when connected to the lower packoff, being axially movable relative to the lower packoff between a first position and a second position;

a latch ring which is supported on the lower packoff, the latch ring being radially expandable into a corresponding locking groove in the first outer tubular member; and a locking mandrel which is operably engaged by the upper packoff such that upon axial movement of the upper packoff from the first position to the second position, the locking mandrel expands the latch ring into the locking groove to thereby lock the upper and lower packoffs to the first outer tubular member;

wherein with the lower packoff locked in position between the inner tubular member and the first outer tubular member and with the second outer tubular member removed from the first outer tubular member, the upper packoff can be removed from the packoff assembly by disconnecting the locking mandrel from the upper packoff and disconnecting the upper packoff from the lower packoff.

19. The packoff assembly of claim 18, wherein the upper packoff is releasably connected to the lower packoff via a threaded connection which converts rotation of the upper packoff relative to the lower packoff into axial movement of the upper packoff relative to the lower packoff.

20. The packoff assembly of claim 19, wherein the locking mandrel is releasably and rotatably connected to the upper packoff.

21. The packoff assembly of claim 20, wherein the locking mandrel is releasably connected to a connecting ring which in turn is rotatably connected to the upper packoff.

22. The packoff assembly of claim 21, wherein the locking mandrel is releasably connected to the connecting ring by a number of screws, each of which extends axially through the connecting ring and into a corresponding bore in the locking mandrel.

23. The packoff assembly of claim 22, wherein the connecting ring is rotatably connected to the upper packoff by a number of screws, each of which extends radially through the connecting ring and into an annular groove which is formed concentrically on an outer surface portion of the upper packoff.

24. The packoff assembly of claim 18, wherein the lower packoff comprises a lower seal support ring and an upper guide sleeve which is connected to or formed integrally with the seal support ring, wherein the upper packoff comprises an upper seal support sleeve and a lower actuating sleeve which is connected to or formed integrally with the seal support sleeve, and wherein the actuating sleeve is releasably connected to the guide sleeve to thereby releasably connect the upper packoff to the lower packoff.

25. The packoff assembly of claim 24, wherein the actuating sleeve is releasably connected to the guide sleeve via a threaded connection which converts rotation of the upper packoff relative to the lower packoff into axial movement of the upper packoff relative to the lower packoff.

26. The packoff assembly of claim 25, wherein the locking mandrel is rotatably connected to the upper packoff.

27. The packoff assembly of claim 26, wherein the locking mandrel is releasably connected to a connecting ring which in turn is rotatably connected to the upper packoff.

28. The packoff assembly of claim 27, wherein the locking mandrel is releasably connected to the connecting ring by a number of screws, each of which extends axially through the connecting ring and into a corresponding bore in the locking mandrel and each of which is accessible upon removal of the second outer tubular member from the first outer tubular member.

29. The packoff assembly of claim 28, wherein the connecting ring is rotatably connected to the upper packoff by a number of screws, each of which extends radially through the connecting ring and into an annular groove which is formed concentrically on an outer surface portion of the upper packoff.

30. The packoff assembly of claim 29, further comprising means for preventing rotation of the lower packoff upon rotation of the upper packoff.

31. The packoff assembly of claim 30, further comprising means for preventing rotation of the locking mandrel upon rotation of the upper packoff.

32. The packoff assembly of claim 18, further comprising a middle packoff which is positioned axially between the upper packoff and the lower packoff, wherein the upper packoff is non-rotatably connected to the middle packoff and the middle packoff is releasably connected to the lower packoff.

33. The packoff assembly of claim 32, wherein the middle packoff is releasably connected to the lower packoff via a threaded connection which converts rotation of the middle packoff relative to the lower packoff into axial movement of the middle packoff relative to the lower packoff.

34. The packoff assembly of claim 33, wherein the middle packoff is releasably connected to the upper packoff.

* * * * *